United States Patent [19]
Taylor

[11] 3,829,271
[45] Aug. 13, 1974

[54] APPARATUS FOR MOLDING STRIP MATERIAL

[76] Inventor: Don A. Taylor, Box Wadsworth, Wadsworth, Ohio 44287

[22] Filed: Nov. 2, 1972

[21] Appl. No.: 303,212

[52] U.S. Cl. ......... 425/385, 425/224, 425/DIG. 201, 425/157, 425/384, 425/406, 425/436, 425/450, 425/31, 425/32, 425/34, 425/47
[51] Int. Cl. .......................................... B29c 3/04
[58] Field of Search ......... 455/385, 22 H, DIG. 201, 455/363, 335, 436, 450, 374, 400, 32, 34, 157, 237, 397; 265/167

[56] References Cited
UNITED STATES PATENTS

| | | | |
|---|---|---|---|
| 3,026,566 | 3/1962 | Martelli et al. | 425/388 X |
| 3,181,202 | 5/1965 | Martelli et al. | 425/388 X |
| 3,314,110 | 4/1967 | Missbach | 425/388 |
| 3,479,694 | 10/1969 | Winstead | 425/388 X |
| 3,492,697 | 2/1970 | Boyce | 425/407 X |
| 3,518,725 | 7/1970 | Donsfio | 425/388 |
| 3,771,938 | 11/1973 | Pinto et al. | 425/397 X |

*Primary Examiner*—Robert L. Spicer, Jr.
*Attorney, Agent, or Firm*—John Harrow Leonard

[57] ABSTRACT

Uncured elastomeric material to be molded into a tire tread is fed progressively from a fixed feed station into a radially outwardly open mold cavity extending partway about the periphery of a cylindrical mold member as the member is rotated about its axis. When charged, the rotation is stopped and one or more mold sections complementary to the member are moved to closed position relative to the cavity and applied under molding pressure. While so applied, the member and sections are heated to cure the molded charge. Upon completion of the curing operation, the mold is opened, the cylndrical mold member rotated, and the molded strip is stripped progressively endwise from the cavity at a fixed discharge station. During stripping, a succeeding charge is fed progressively into the cavity, and, at the end of the stripping step, the operation is repeated. The material may be delivered to the cavity as a prepared strip of raw material at room temperature or extruded directly by an extruder into the cavity at elevated extruding temperature. A plurality of like molds may be arranged to be charged successively from a single extruder so that each mold can be stripped and charged while curing is being effected in the others, thus rendering the production of threads substantially continuous.

10 Claims, 11 Drawing Figures

APPARATUS FOR MOLDING STRIP MATERIAL

BACKGROUND OF INVENTION

1. Field of Invention

Compression molding of elastomeric materials.

2. Description of Prior Art

Heretofore a new technique has been developed for recapping worn automobile tires. Prior thereto, worn tread was stripped off of a tire carcass, the exposed carcass surface was prepared, and an unvulcanized strip of elastomeric material was applied, molded and vulcanized onto the carcass, the molding operation imparting the tread design desired. However, this technique had inherent limitations in the amount of pressure which could be applied internally of the carcass for holding the carcass in shape against the pressure exerted by the external mold. Usually this internal pressure was applied by air bags disposed within the carcass and inflated. The pressure which could be applied in this manner was necessarily limited and as a result the tread strip was not compacted to the optimum degree, but tended to be unduly soft and porous.

Later, the technique was improved so that the tread strip for capping was formed by molding and vulcanizing in compression molds separate and apart from the carcass. The resultant tread was then applied to the carcass and cemented in place by the newer cements then available. Inasmuch as the capping tread strip was molded in compression molds under mechanical pressure applied from both faces, the capping strip was more dense than could be obtained by the earlier technique and had better wearing qualities.

This newer approach, however, introduced disadvantages in manufacture of the tread strips themselves in that the strips generally had to be formed in long lengths requiring a number of presses arranged in a row in side by side juxtaposed relation. A number of elongated linear compression molds, each comprising two companion sections, were charged and inserted in the mold space defined by the row of presses.

Usually each strip was made in a length such that it could readily be cut into proper multiples as required by the circumferences of the tires being recapped, with a minimum of wastage. Lengths of about 36 feet were generally found the ideal length for the recapper to use for the best economies in production. In this process, the original raw elastomeric material, after being mixed, is extruded into long strips which are partially cured sufficiently only to hold their shapes. They are then cooled, usually by water, and rolled into coils for transfer to, and mounting in a position for, unreeling and cutting to length for fitting it into the molds. This, of course, requires several steps; first initial heating sufficiently so that it will hold its shape, cooling so that the strip can be reeled up without sticking, winding into coils, transporting to the molding site, then unreeling, cutting to length, manual placing in the molds, and manually stacking the long and heavy charged molds into the mold space.

Another difficult and expensive operation in this technique is removing the long heavy molds endwise from the molding space, while still heated, immediately after curing, and stripping the strips therefrom.

The production of vulcanized tread strips by this technique is very time consuming, often requiring as long as thirty minutes and drastically reduces productivity obtainable from the existing equipment.

One difficulty of introducing the molds into the common mold space results from the nature of the presses required. The presses usually were of the type having four corner posts or strain rods so that the molds had to be removed endwise from one end of the row of presses, charged and slid back into the mold space.

Attempts were made to overcome this difficulty by providing presses of the C-frame type, arranged to provide a common open side extending endwise of the row. While this was satisfactory insofar as the manner in which loading and discharge could be effected, it created very serious additional problems in that presses of the open face design tended to deflect, under the extremely large total pressure required for molding a dense strip of such large area, beyond the amount permissible to meet the tolerance required in pre-molded and dense tread strips. In this connection, it is to be noted that a close tolerance is necessary not only for effecting a proper fitting and bonding operation, but also for assuring proper dynamic balance of the recapped tire. Not only does this impose a loss of heat but also excessive time. First, the temperature of the extruded material must be reduced, and next, starting at room temperature, the temperature must be brought to molding and curing temperature, and held at that elevated curing temperature for approximately 30 minutes.

In accordance with the present invention, a method and apparatus are provided whereby the original extruded material can be fed directly, intermittently but almost continuously, into the required molding apparatus, molded therein, and removed without any substantial manual labor. Loading of the mold and discharge of the molded product can be accomplished concurrently in a very short period of time. The material can be fed into the mold while retaining the heat originally imparted to it during extrusion. By using a common extruder or feed apparatus, and a plurality of molds, an almost continuous operation is provided. Furthermore, due to the nature of the mold itself, uniform density and dimensional accuracy is provided throughout the entire strip. The molding apparatus is of such shape and arrangement that much less floor space is required than with apparatus currently used.

The molding operation is such that deflection in the moving parts of the apparatus is substantially eliminated, thus assuring precise dimensions and shaped in the finished product. If desired, the raw material for the strips can be introduced directly into the mold in powdered form, thereby eliminating greatly the now extensive material preparation and manual handling.

Again, in order to shorten the time cycle, the material may be pre-plasticized and brought to an advanced temperature, such as around 150° to 200° F., in the extruding machine and transferred in this heated condition into the preheated mold cavity, thereby reducing the curing period from 30 minutes to 10 or 15 minutes.

Various other advantages will become apparent from the following description in which reference is made to the drawing.

Referring to the drawing, the molding machine or apparatus of the present invention comprises a base 1 and a head plate 2 secured in fixed spaced relation above the base by strain rods 3, arranged one pair at the front and one pair at the rear of the base 1. Slidably mounted for vertical movement, one on each pair of the strain rods 3, are spaced supports 4 having aligned bearings 5. The mold includes a cylindrical or drum mold member 6 which is supported for rotation about a horizontal axis by trunnions 7, which, in turn, are supported in the bearings 5, respectively. The mold member 6 is provided with a peripherally extending radially outwardly open channel 8 which extends about the major portion of the circumference of the member 6 and which is provided with suitable mold inserts, later to be described, to define a mold cavity of the cross sections required by the tread strip to be molded.

Stop collars 9 are adjustably mounted on the strain rods 3 and limit the downward movement of the supports 4 to a predetermined lowered open mold position.

Disposed in the mold space defined by the strain rods 3 is a platen 11 which is supported by a plurality of piston rods 12 of reversible hydraulic piston and cylinder assemblages 13, respectively, of which the cylinders extend below the base 1 into the usual pit below the floor level of the molding apparatus. The reversible assemblages 13 are operable to raise and lower the platen 11, selectively, and to apply through it the required degree of molding pressure to the mold.

The mold also includes a bottom mold section 15 guided for vertical movement relative to the base 1 and platen 11 by guide blocks 16 which are in guiding relation to the strain rods 3, respectively, so that the bottom mold section 15 can be lifted and lowered while remaining at all times parallel to its starting position. The lower mold section 15 has a molding rim 15a which, in the closed position of the mold section 15, closes the mold segments in the portion of the channel 8 with which it is coextensive circumferentially of the member 6.

Above the mold member 6 is a mold section 17, similar to the mold section 15, having a molding rim 17a which, in the closed position of the mold section 17, closes mold segments in the circumferential portion of the channel 8 of the rotatable mold member 6 with which the mold section 17 is coextensive circumferentially. The mold section 17 is supported for guided vertical movement, parallel to its starting position, on the strain rods 3 by suitable guide and stop blocks 18.

Stop collars 19 are adjustably mounted on the strain rods 3 for limiting the downward movement of the mold section 17 to a predetermined lowered position in spaced relation below the head plate 2, from which position it can be lifted and guided upwardly to engage its upper end with the underface of the plate 2. Adjustable stop collars 20 also are mounted on the rods 3 for limiting the downward movement of the mold section 15 to a position in which it is spaced below the mold member 6 and spaced above the upper face of the platen 11 when the platen 11 is fully lowered.

Figure 1:
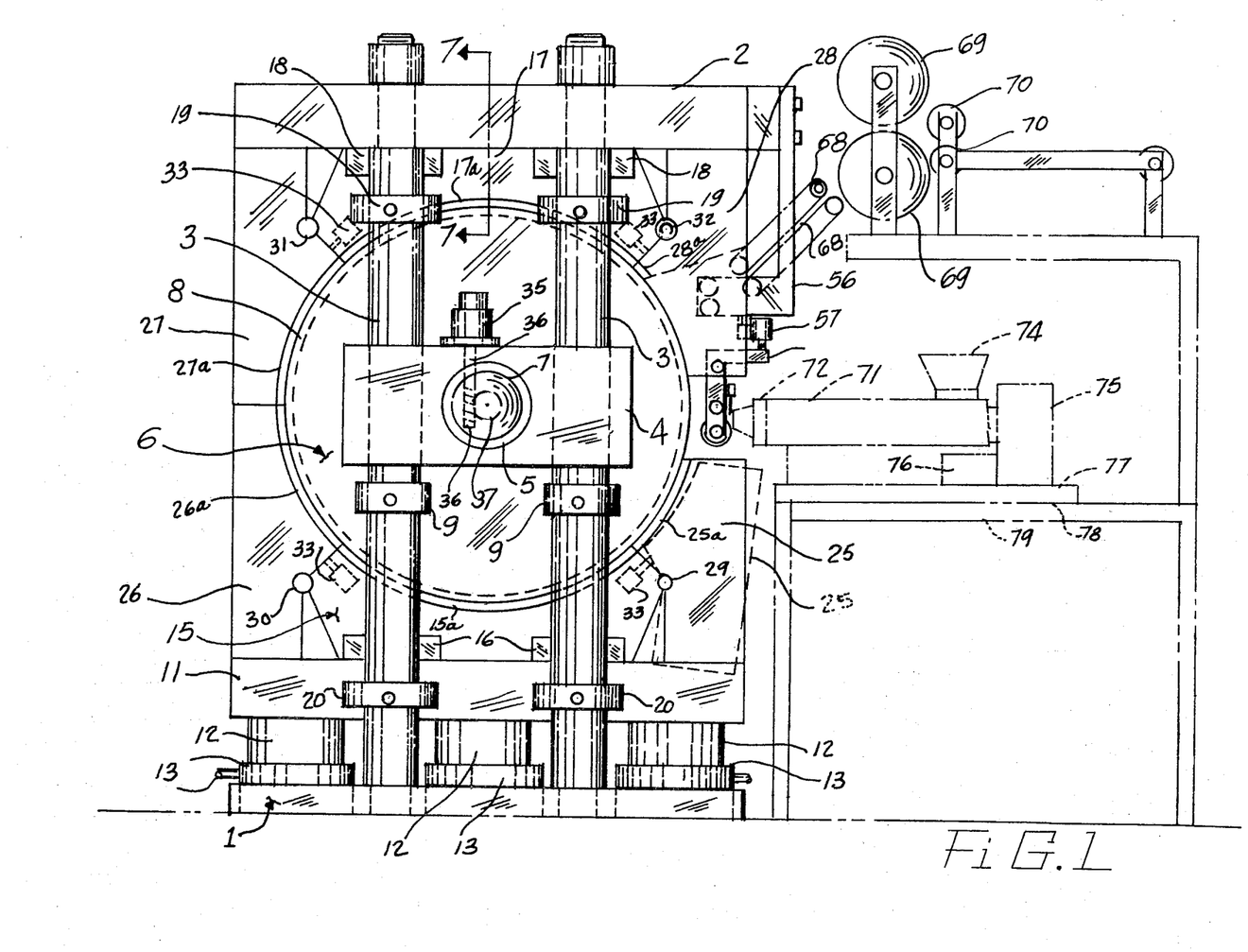
FIG. 1 is a front elevation of a molding machine embodying the principles of the present invention, and showing the mold in closed position and showing a feeding mechanism and a discharge mechanism used in connection therewith.

From the structure thus far described, it fully is apparent that, starting in the closed position of the mold illustrated in FIG. 1, as the platen 11 is lowered from its raised position to its maximum lowered position, the following sequential movements can occur:

First the lower mold section 15, the mold member 6, and the upper mold section 17 are lowered as a unit, in closed relation until the guide and stop blocks 18 engage the collars 19 and arrest farther downward movement of the mold section 17. Next, the cylindrical mold member 6 lowers, withdrawing from the mold section 17 to progressively more open position until the supports 4 engage the collars 9 and arrest farther downward movement of the member 6. As the platen 11 continues downwardly, the mold section 15 lowers from the bottom of the mold member 6 to a progressively more open position until the guide and stop blocks 16 engage the collars 20 and arrest farther downward movement of the mold section 15. The platen 11 continues downwardly to its fully lowered position in which it is spaced from the bottom of the mold section 15. In this fully lowered position of the platen 11, the mold is fully open and ready for charging.

The mold sections 15 and 17 could extend circumferentially of the mold member 6 substantially to a horizontal plane through its axis, allowance being made only for a space for feeding raw material into the mold and for withdrawing the molded strip therefrom, as is later described. However, with the mold sections 15 and 17 substantially hemi-cylindrical, then to move them from a closed position relative to the mold member 6 to a fully open position for admitting a new charge of material into the mold cavity, the sections would have to be moved a very long distance vertically in their opening directions to dispose their complementary molding faces at their circumferential ends a sufficient distance radially from the channel 8 to permit ready access thereto for feeding. This is due, of course, to the fact that the portions of the sections 15 and 16 near their circumferential ends move substantially tangentially relative to the adjacent portions of the mold member 6, and only if the sections 15 and 17 were moved lineally toward open position a distance equal to from about one third to about one half of the radius of the member 6, would the circumferential ends of such portions be spaced adequately radially from the channel 8 to afford access.

Accordingly each of the mold sections 15 and 17 is made to extend only about one quarter of the distance about the circumference of the mold member 6, and therebeyond supplemental mold sections are provided and are arranged to be moved relative to the member 6 transversely of the upright path of movement of the sections 15 and 17.

In the form illustrated, four supplemental mold sections are provided. One section 25 is located at the right hand end of the mold section 15, adjacent to, and below, the location or station at which material is to be fed into the mold. Another supplemental mold section 26 is disposed at the opposite or left end of the mold section 15. A mold section 27 is carried by the mold section 17 at its left hand end, and a modified mold section 28 is carried by the mold 17 at its right hand end and adjacent the location or station at which the molded tread strip is to be discharged from the mold. These sections have mold rims 25a, 26a, 27a and 28a, respectively, which in the closed position of the associated mold sections cooperate with the circumferential mold cavity segments in the channel 8 to mold the material.

Figure 2:
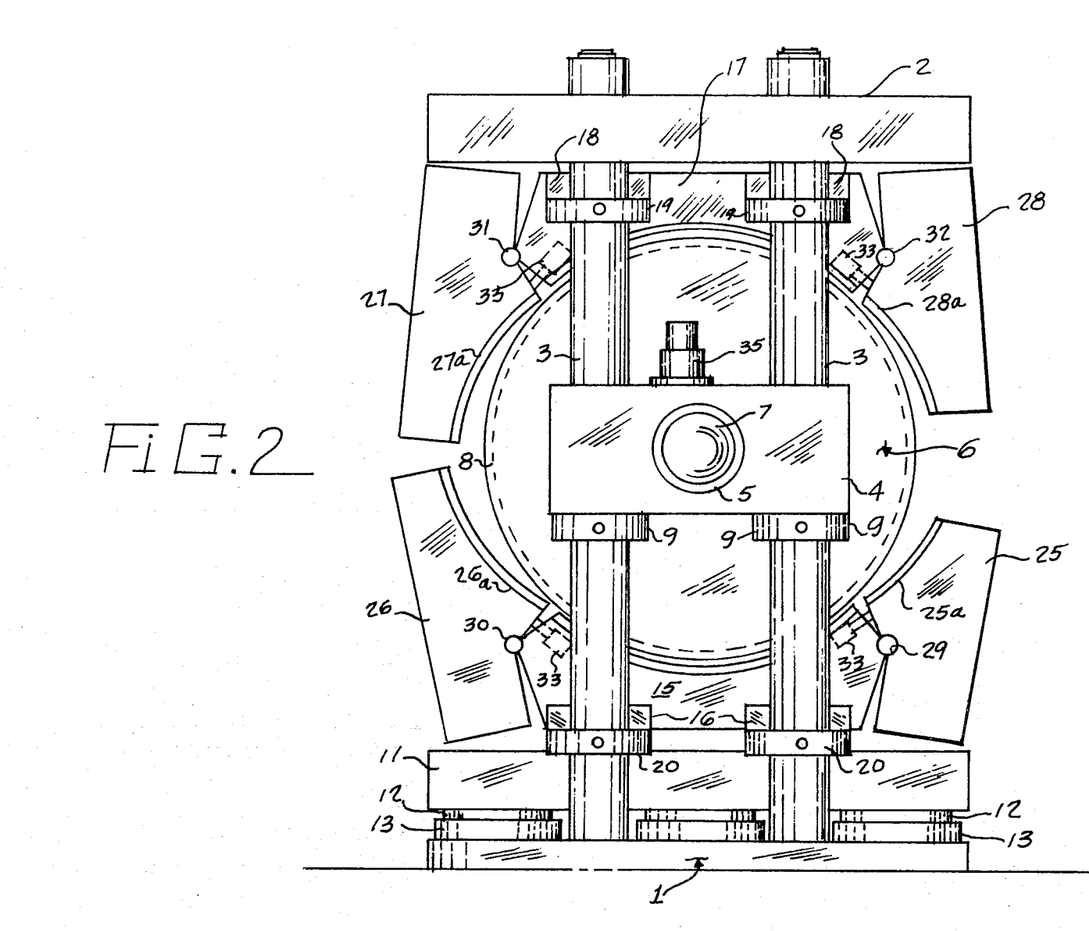
FIG. 2 is a front elevation of the machine illustrated in FIG. 1 showing the molds in open position.

Referring first to the lower right hand mold section 25, this section is connected by a pivot 29 to the right end of the mold section 15 for swinging, from a closed position outwardly clockwise to an open position, as illustrated in FIG. 2, when the mold sections 15 and 25 are free from the platen 11.

The mold section 26 is pivoted in a like manner to the left hand end of the mold section 15 by a pivot 30. The upper mold section 27 is similarly connected by a pivot 31 to the left hand end of the mold section 17 and the section 28 is pivoted by a pivot 32 to the right hand end of the mold section 17. Each of the sections 25 through 28 is biased to swing about its pivotal axis, transversely of the upright path of the mold sections 15 and 17, to open position by an associated reversible hydraulic piston and cylinder assemblage 33 which is carried by the mold section 15 or 17 to which the associated supplemental mold section is pivotally connected.

The adjacent ends of rims 25a and 28a terminate a short distance circumferentially of the mold member 6 from each other, thus leaving an open circumferential space for accommodating a feeding mechanism and a stripping mechanism, later to be described.

The feeding and discharge of the material from the mold involves the rotation of the cylindrical mold member about the axis of its trunnions 7. For rotating the mold member 6, a driving motor 35 is mounted on one of the supports 4 and has a drive shaft on which is a driving worm gear 36 which is in driving engagement with a complementary driven gear 37 mounted on, and rotatable with, one of the trunnions 7. The motor 35 is controlled by conventional switch means so that the mold member 6 may be rotated and stopped, selectively, where desired. This driving mechanism is self-locking in the stopped position of the mold member 6. The motor 35 is reversible so that the member 6 can be backed up to position the trailing end of the molded strip to be engaged in abutting relation by the leading end of a succeeding charge.

In operation of the mold, upon lowering of the platen 11, to its lowermost position, the mold member 6 is first withdrawn from the mold section 17 whereupon the mold section 17 lowers from the head plate 2 and concurrently the mold sections 27 and 28 swing outwardly to open position. The mold member 6 then moves to fully open position below the mold section 17. As the mold section 15 is withdrawn downwardly from the mold member 6, the mold sections 25 and 26 swing outwardly to fully open position, all as indicated in FIG. 2.

The channel 8 in the cylindrical mold member 6 extends endwise, preferably about substantially the entire circumference of the member 6. The channel 8 is formed in the rim 40 of the mold member 6. The rim 40 has a circumferential wall 41 and radial side walls or flanges 42. The wall 41 has heating passage 43 into which steam is introduced in a conventional manner, or in which conventional electrical heating cells are mounted, for heating the mold. Seated on the outer face of the wall 41 are segmental detachable molds. Mounted in the channel 8 are detachable segmental mold elements 44 having ribs 44a, which impart the ribbed tread formation to the molded strip, and having lateral flanges 44b. The shape of the ribs is dictated by the shape of the tread desired.

In the form illustrated, the ribs 44a are shown as shaped for molding treads T which, for simplicity in illustration, extend straight across the strip.

The mold sections 25 through 28 have steam heating passages 45 functioning therein in the same manner as the passages 43.

If the material to be molded is of a type which is to be cured or set by cooling the mold, then a suitable cooling medium, such as water, may be circulated through the passages 43 and 45.

Figure 3:
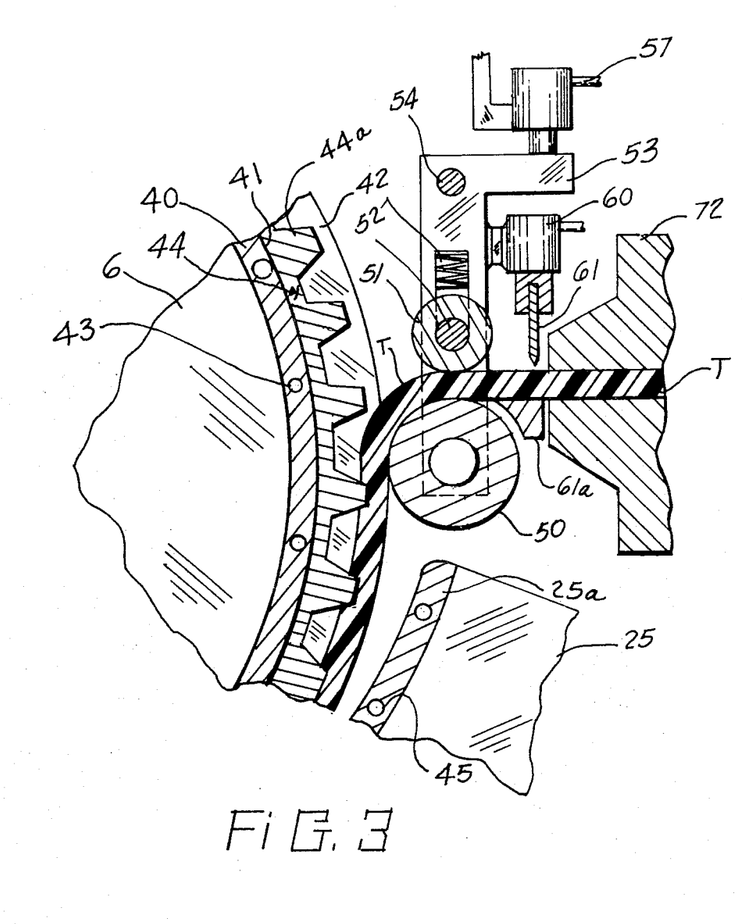
FIG. 3 is an enlarged fragmentary vertical sectional view taken on the line 3—3 in FIG. 2, and illustrating the feeding of the material into the open mold.
Figure 4:
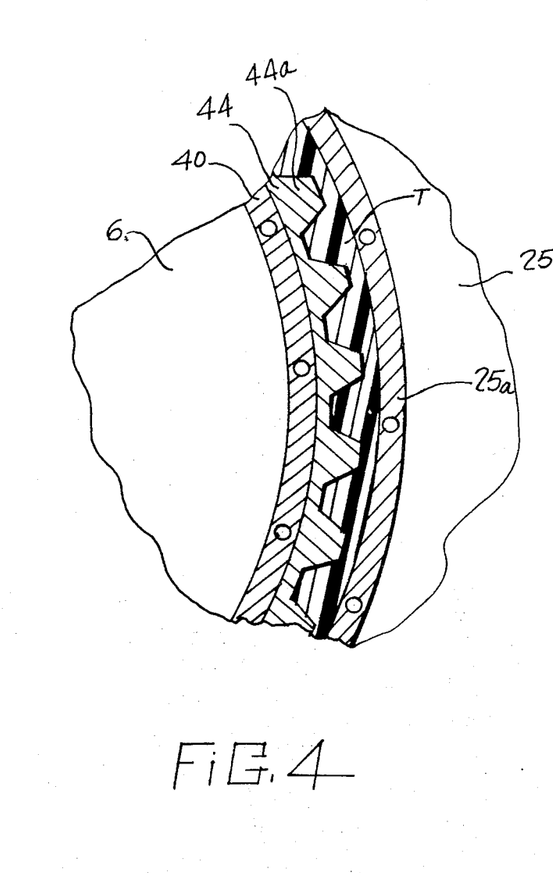
FIG. 4 is a fragmentary vertical sectional view of the molding machine at a location circumferentially spaced from the portion shown in FIG. 3, and showing the mold in closed condition.
Figure 5:
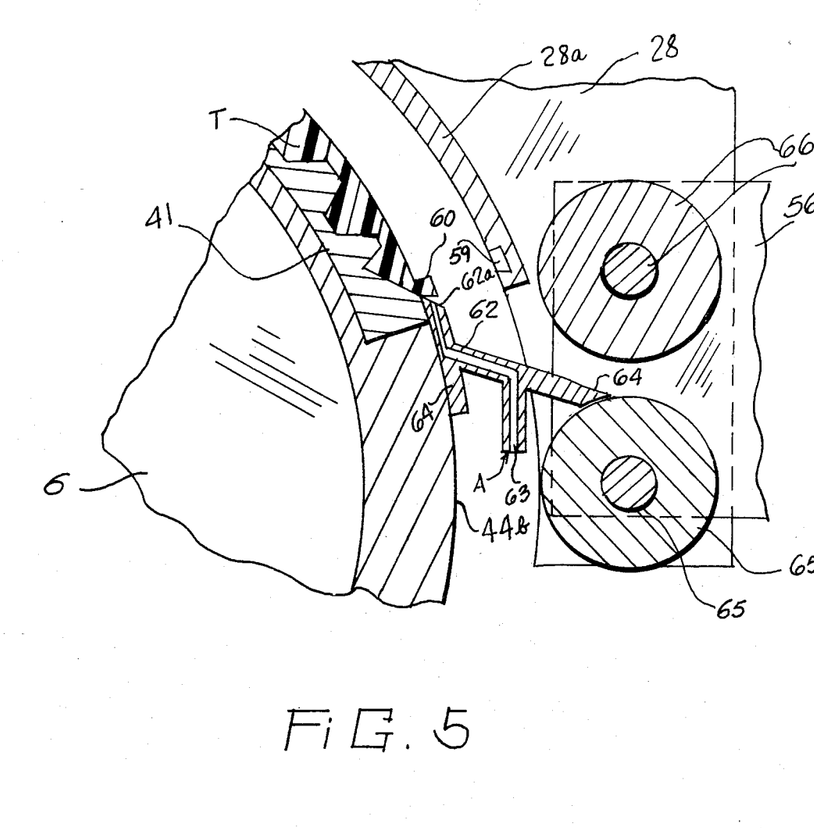
FIG. 5 is a fragmentary vertical sectional view of part of the structure illustrated in FIG. 3, illustrating the initiation of the removal of the cured recap tread strip from the mold.
Figure 6:
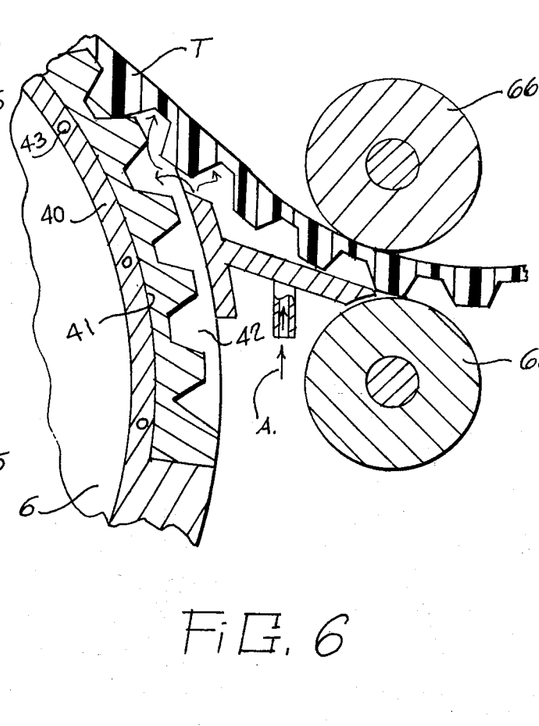
FIG. 6 is a view similar to FIG. 5 showing the relation of the parts and a cured strip during removal of the strip from the open mold.

When the mold is in open position, the outer perimeter of mold cavity provided by the segmental mold elements 44 and the open mold sections 25 through 28 define a circumferential mold cavity into which the material to be molded may be fed. The material is fed into this cavity at a feed station which is located a short distance above the level of the upper end of the mold section 25. This station is fixed in position circumferentially of the axis of the mold member 6. The material may be fed into the mold as a conventional preformed partially vulcanized strip at room temperature, but preferably is injected directly into the mold in heated condition. For this purpose, entry feed rolls, as best illustrated in FIG. 3, are provided and the material, injected as a strip while still heated, by the heat imparted to it prior to and during injection, or as a preformed and cooled strip, is fed endwise betwee a main feed roll 50 and a spring pressed holding roll 51, biased into yielding engagement with the top of the strip by a spring 52. These rolls may be power driven, if desired. They are mounted on a rocker arm 53 supported by a pivot 54 on a bracket 56 carried by the head plate 2.

Mounted on the bracket 56 is a reversible hydraulic piston and cylinder assemblage 57 which can be operated to swing the rocker arm 53 clockwise about the pivot 54 for forcing the roll 50 toward the cavity of the mold member 6. The roll 50, when so moved, presses the material being fed sufficiently firmly against the outer surfaces of the ribs 44a of the heated mold segments 44 so that the material adheres thereto as it engages the ribs.

Upon starting of the feeding operation, the motor 35 is operated to rotate the mold member 6 clockwise about its axis and the material, due to its adherence to the ribs 44a, is carried by the mold member 6 and laid about the outer peripheries of the ribs progressively endwise of the strip and cavity. The rotation of the mold member 6 and the rate of extrusion or other feed of the strip material are timed to assure proper and uniform feeding and filling of the cavity.

The strip of material is fed until the cavity is charged. In the illustrative example, the cavity extends substantially 315° about the circumference of the member 6. The leading end of the strip is carried opposite a notch 59 in the rim 28a of the mold section 28. When sufficient material is fed so thats leading end reaches this point, a reversible cut-off piston and cylinder assemblage 60 is operated and drives a knife 61 downwardly to sever the material being fed. The cut-off mechanism may be carried on the rocker arm 53, as illustrated. The cut-off is at such point that the mold cavity will be fully charged throughout its circumferential extent and so that the notch 59 can be filled with material.

After the cut-off, the platen 11 is raised, first raising the mold section 15 against the under face of the mold member 6 and, in time, the upper mold section 17, and continuing until the mold section 17 bears against the under face of the head plate 2.

As the plate 2 engages the lower ends of the mold sections 25 and 26, it lifts them while urging them against the opening bias of their piston and cylinder assemblages 33, and thereby lifts the mold section 15. By the time the rim 15a reaches closed position, the mold sections 25 and 26 have been swung to closing position, and their lower ends are fully seated on the platen so that the molding pressure of the platen 11 is directly applied to the mold sections 15, 25, and 26 as a unit, and the pivots 30 are not subjected to the force imposed by the platen 11 as the mold is fully closed. Likewise, as the mold member 6 is raised, the mold sections 27 and 28 first engage the head plate 2 and are swung inwardly in like manner as the mold sections 25 and 26, and they and the mold section 17 are then lifted as a unit and the reactionary force of the head plate 2 is applied directly to and over their upper faces. Following mold closure, the mold is heated to vulcanize the charge.

When the molding operation is complete, the platen 11 is lowered, as is also the lower mold section 15, and thereby the cylindrical mold member 6 and the upper mold section 17 are lowered until the downward movement of the mold section 17 is arrested. As the mold section 17 is lowered from the head plate 2, it carries with it the sections 27 and 28. As they recede from the plate 2, they are swung about their pivots 31 and 32, to open position by their assemblages 33.

As the platen 11 lowers from the mold section 15, the mold sections 25 and 26 are released and are moved to open positions by their piston and cylinder assemblages 3.

Due to the configuration of the molding surfaces of the cylindrical mold member 6, as provided by the ribs 44a, the molded strip adheres to the mold member 6. After opening the mold, the member 6 is rotated clockwise for the discharge. The material which filled the cavity 59, forms a rib 60.

In order to strip the molded strip from the mold member 6, a stripping device is provided. The stripping device is fixedly mounted on the bracket 56 and comprises a shoe 62 which normally rides on the outer peripheral surface of the ribs 44b of the mold segments in the channel 8. The shoe 62 has a beveled end 62a so positioned that it engages the base of the nib 60, forcing the leading end of the strip out of the mold cavity, passing under the strip, and progressively forcing the strip away from the cylindrical mold member 6 as the mold is rotated in a clockwise direction, as illustrated in FIG. 3. In order to assist in this removal, the shoe has a internal duct 63 through which air under pressure is supplied and discharged through a port in the beveled surface 62a, as indicated. The shoe has a trailing guide portion 64 sloping downwardly and outwardly therefrom into a position to lead the strip between a carrier roll 65 and a holding roll 66. Thus, as the cylindrical mold member 6 turns clockwise, the strip of molding material is stripped therefrom and passed between the rolls 65 and 66 and thence between driven conveyor belts 68 which pass it to conventional cooling drums 69 and thence between conveyor rolls 70 which, in turn, pass the molded strip onto a supporting platform or to a reel, as desired.

Concurrently with the stripping of the vulcanized strip progressively from the mold member 6, a new charge is progressively fed into the mold.

As mentioned, the uncured strip may be fed to the molds from a reel of cooled preformed strip. However, for speed in production and conservation of heat, it is preferable that the strip be extruded and fed with its residual heat of extrusion into the molds. The injected material, being preheated, distributes itself more uniformly upon closure of the mold because of lessened differential in temperature and curing between the thick tread and the lesser thickness of the base of the strip.

Figure 7:
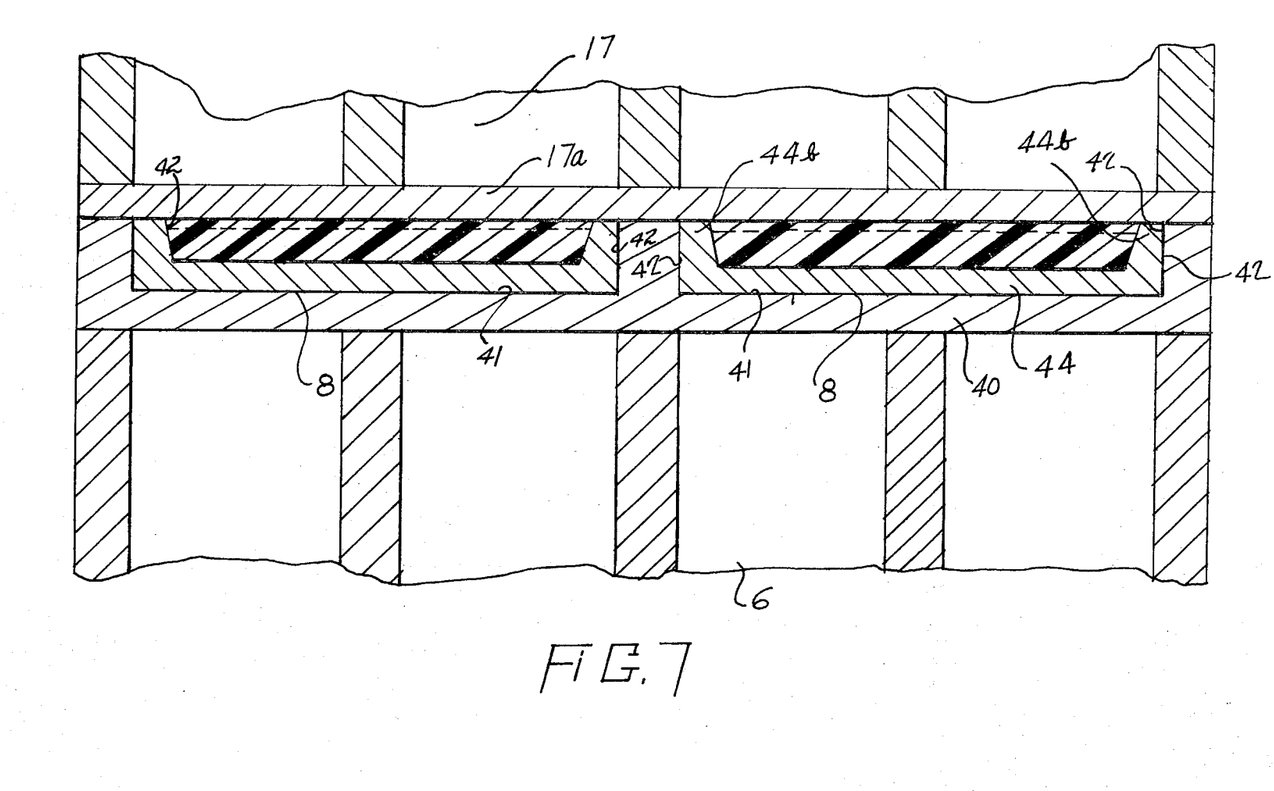
FIG. 7 is an enlarged vertical sectional view taken on the lines 7—7 in FIG. 1.
Figure 8:
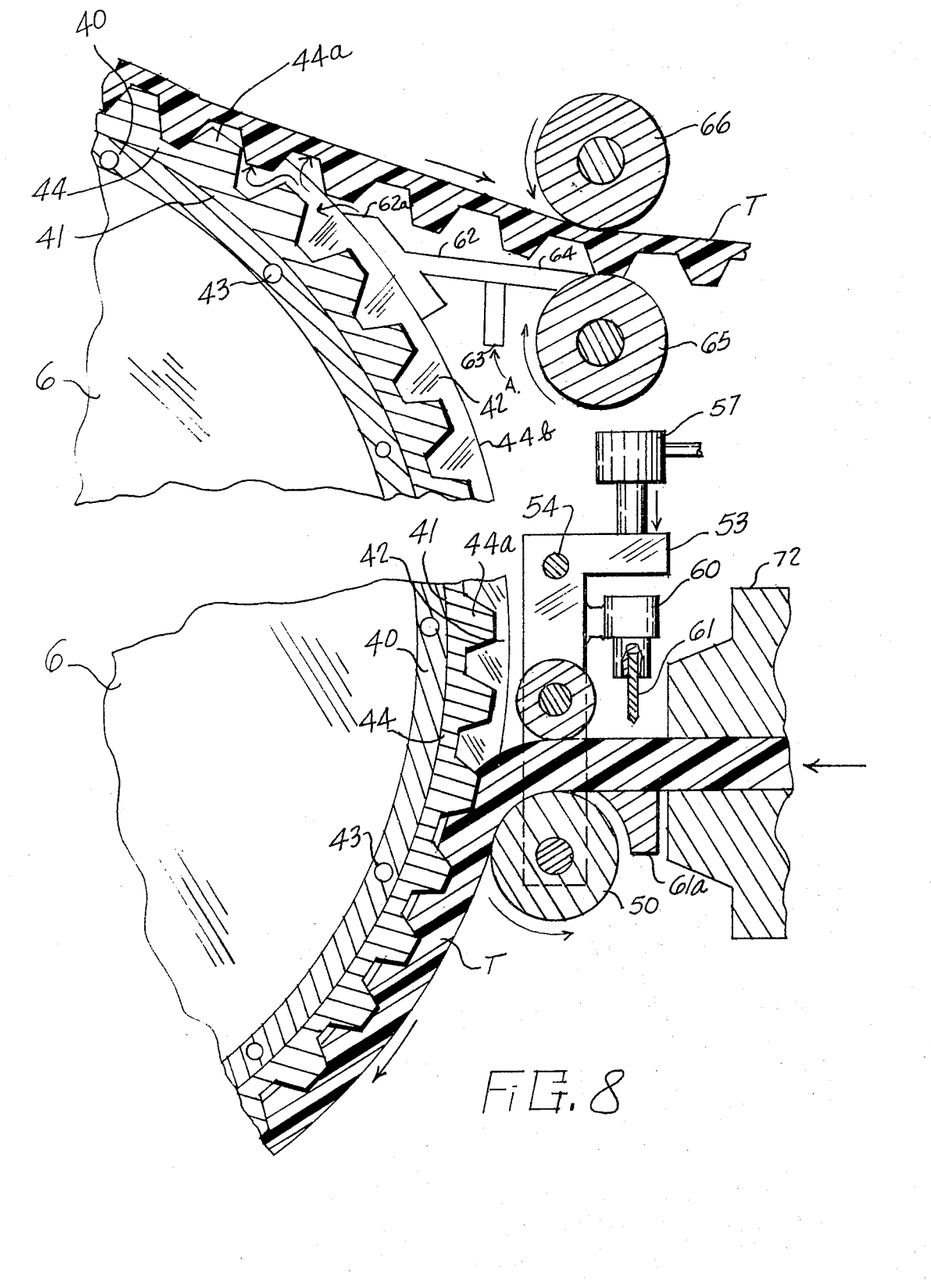
FIG. 8 is an enlarged fragmentary vertical sectional view similar to FIGS. 3 and 5, showing the relation of the feeding and stripping means.
Figure 9:
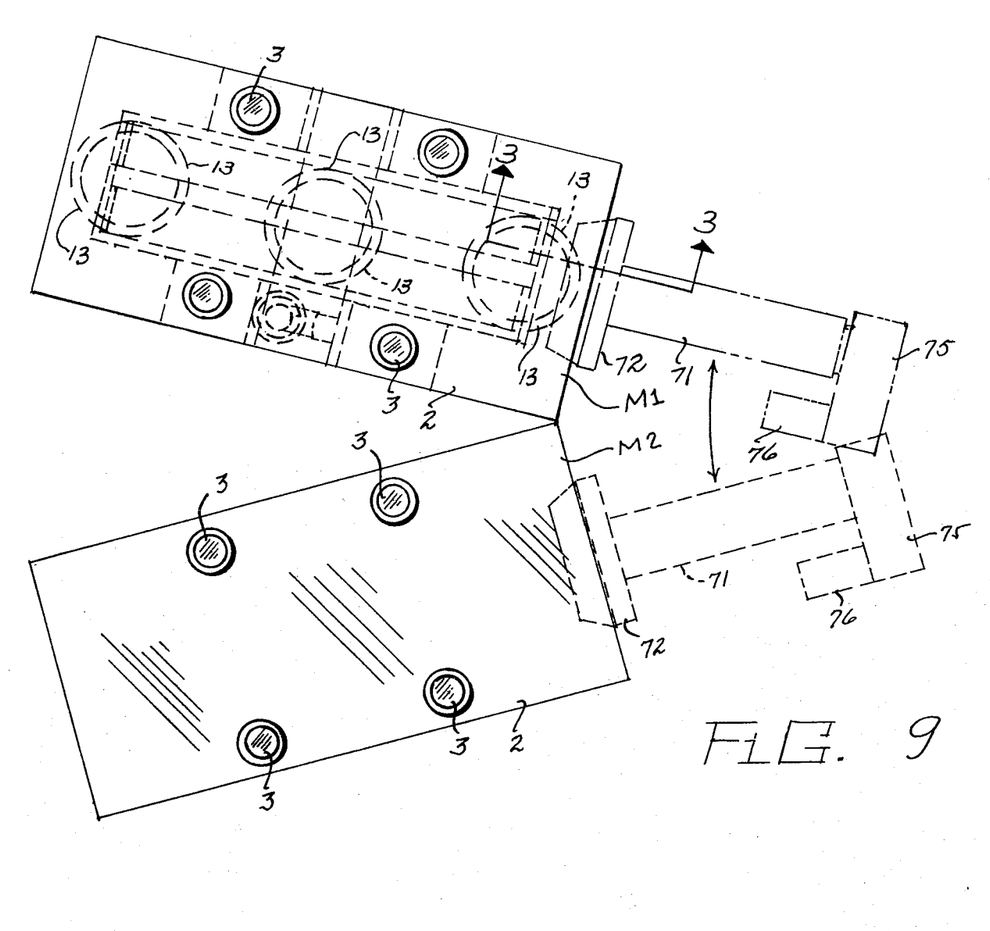
FIG. 9 is a top plan view of the two molding machines, such as illustrated in FIG. 1, arranged for alternate operations in connection with a common feed mechanism.

Since the curing cycle requires a substantial period of time, two, or more, of the mold mechanisms above described are provided and are arranged, as illustrated in FIG. 7, in converging relation toward an extruder 71. The extruder 71 has an extruding nozzle 72 proportioned to extrude a strip of preselected thickness and width of material required directly between the rolls 50 and 51. The extruder has a conventional feed hopper 74 and is driven for feeding or extruding by reduction gears 75 driven, in turn, by a motor 76. The extruder 71 is mounted for reciprocation toward and away from the rolls 50 and 51 in guideways 77. The guideways are mounted on the top of a plate 78 which is supported on a frame 79 for rotation about an upright axis. Thus the extruder can be moved lineally away from one mold and swung about the pivotal axis into alignment with another mold, and then moved lineally toward the latter mold to feeding position relative thereto. These relations are so chosen, as illustrated in FIG. 9, so that the extruder can be swung into the position for the first one of the molds, indicated at $M_1$, the other of the molds, indicated at $M_2$. Thus, as the curing is being effected in one mold, the feeding and stripping operations are performed with respect to the other mold. This has the distinct advantage of conservation of time and also conservation of heat. In addition, it makes possible the almost continuous operation of the extruder, so that the proper flow at the proper temperature is assured at all times. For example, the material can leave the extruder at 150° F. to 250° F., and transferred with this residual heat to the mold preheated by residual heat from the previous molding operation, thus reducing the cycle from 30 minutes to 10 or 15 minutes.

The entire mechanism can be fully automated readily, and lends itself, when two or more molds are used, as above mentioned, to a substantially continuous operation. Any number of molds can be used with a single extruder, production depending upon the capabilities of the extruder and the particular cycle desired.

The material can be fed into the mold in powdered form, thus eliminating the preparation step, if desired.

As shown, particularly in FIG. 7, each cylindrical mold member 6 may have two channels 8, each containing mold segments as above described, and each channel may be provided with its feed mechanism and stripping mechanism and supplemental mold sections. When so provided, both mold cavities are charged concurrently and stripped concurrently, with doubled production for each cylindrical mold member.

Figure 10:
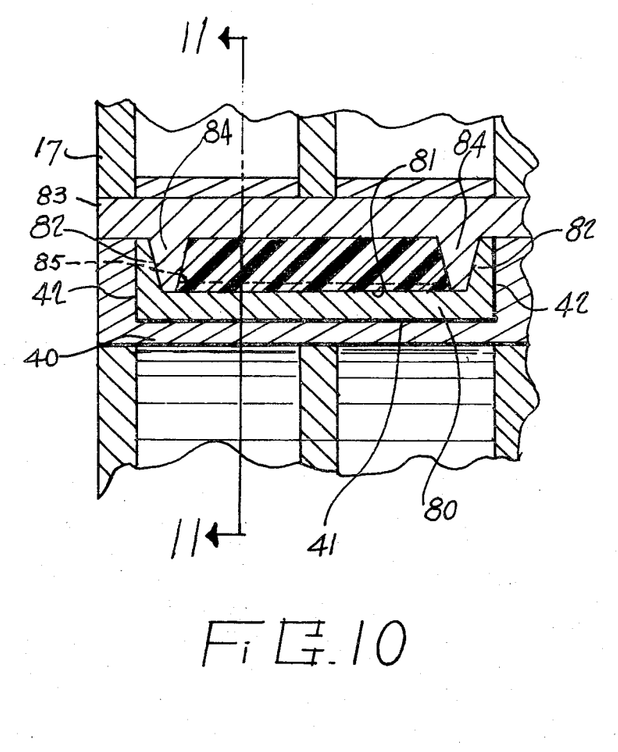
FIG. 10 is a fragmentary cross sectional view illustrating a modified form of the mold used in the present invention.
Figure 11:
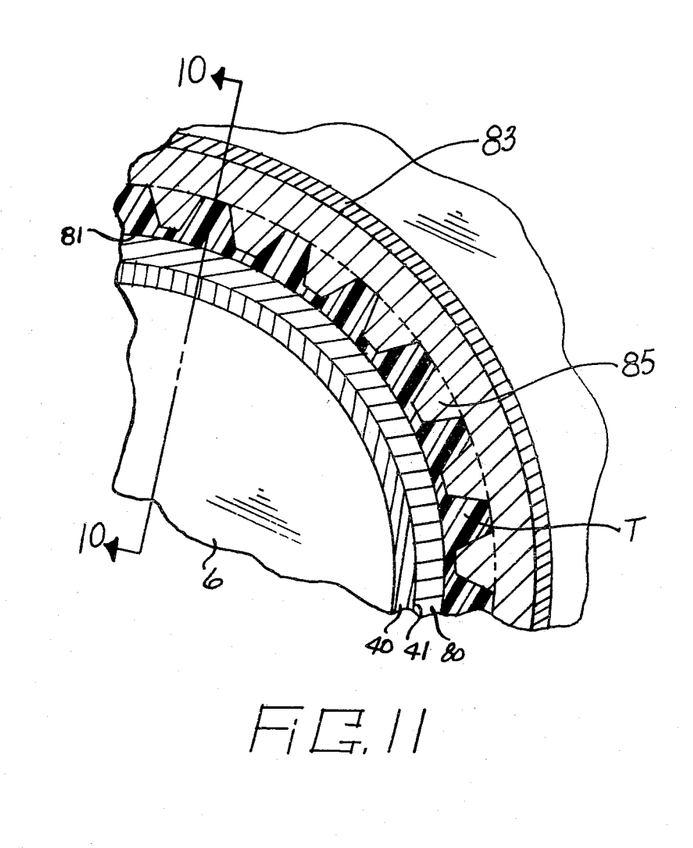
FIG. 11 is a sectional view of the mold illustrated in FIG. 10 and is taken on the line 11—11 of FIG. 10.

In the structure described, the strip is molded with the treads disposed at the face toward the cylindrical mold member. In such case, the cooling cycle is such that the strip can be laid flat while hot and stress relieved by its residual heat. If it is desired that the tread be on the outer or convex face of the strip as it issues from the mold member 6, the mold segments for forming the ribs may be carried by the mold sections 25 through 28, and blank segments may be installed on the wall 41 of the channel 8, as illustrated in FIGS. 10 and 11. As there illustrated, the channel 8 defined by the rim surface 41 and flanges 42, carries mold segments 80 which are channel shaped, having a cylindrical outer face 81 and flanges 82. Each of the mold segments has a ribbed molding face for forming the tread. For example, as illustrated, the mold section 17, has a rim 83 having lateral flanges 84 which are received telescopically between the flanges 82 and which confine the strip laterally during molding. The rim 83 has ribs 85 between which the ribs of the tread are formed. With this modification, the molded and cured strip has the tread at the convex face and the strip is partially curved in the direction necessary for coiling and installation on a tire.

Having thus described my invention, I claim:

1. A molding apparatus comprising:
    an inner mold member having an elongated, external, outwardly exposed, curvilinear peripheral molding portion;
    means supporting the inner member for rotation of said molding portion about its axis;
    a feeding station and a discharge station, said stations being spaced apart from each other about the axis of curvature;
    an outer mold member having a molding portion complementary to the peripheral molding portion and defining therewith, when the members are in closed relation, a mold cavity extending endwise peripherally of said axis from the feeding station to the discharge station;
    means for rotating the inner member in at least one direction while the members are in open position, and for stopping said rotation prior to closing the members;
    means for progressively feeding a strip of uncured material into said open cavity at the feed station while the inner member is being rotated in said one direction;
    means for moving the members to closed position for molding the strip while the inner member is stopped, and for opening the members at the end of the curing operation; and
    means to introduce media into the members so as to subject the material to curing conditions and to cure the material while the members are closed.

2. The apparatus according to claim 1 wherein stripping means are provided, adjacent the discharge station, for stripping the molded and cured material endwise from the inner mold member progressively as its molding portion passes progressively past said discharge location.

3. The apparatus according to claim 1 wherein the outer mold member is sectional, and includes at least two sections at opposite sides of said axis and movable in paths relative toward each other and toward the axis of the inner mold member, to closed position, and includes at least one additional section movable toward and away from the periphery of the inner mold member to closed and open positions, respectively, in another path angularly disposed to said paths.

4. The apparatus according to claim 1 wherein the mold surface of the inner mold member is annular and is at the peripheral surface of the inner member and extends, circumferentially, of said axis;
    the outer mold member is a sectional mold and includes two sections at opposite sides of the axis and movable in a lineal path to open and closed positions, respectively, relative to the inner mold member and relative to each other;
    pairs of additional sections are mounted adjacent the said two sections, respectively, the sections of each pair being at opposite ends, respectively, of the associated one of said two sections, and supported for movement therewith along said lineal path and for movement relative thereto transversely of said path to open and closed positions relative to the inner member; and
    all of said mold sections, when in closed position, define with the inner mold member, a continuous uninterrupted molding cavity extending circumferentially of the inner member from adjacent the feeding station to adjacent the discharge station.

5. The apparatus according to claim 3 wherein vertical guide means are provided;
    support means are slidable along the guide means and support the inner member with its axis horizontal and for rotation about its said axis;
    auxiliary support means are slidable vertically along said guide means and support said two mold sections for independent vertical movement relative to each other and relative to the inner mold member, to open and closed positions, respectively;
    at least two additional mold sections are provided; and
    additional support means support the additional mold sections for movement in opposite directions along said vertical path and concurrent movement to open and closed positions, respectively, in paths angularly disposed, to said lineal path.

6. The apparatus according to claim 5 wherein a press is provided and includes a top plate, a base, vertical strain rods connecting the top plate and base, and a power driven vertically reciprocable ram;
said rods are the guide means for the supports of the inner mold member and for the supporting means of the lineally movable die sections; and
all of the mold sections are disposed between the plate and ram.

7. The apparatus according to claim 5 wherein said additional support means also support the additional mold sections for movement bodily concurrently along said lineal path.

8. The apparatus according to claim 7 wherein the additional support means connect the additional mold sections to the said two mold sections, at least one additional mold section to each of the two mold sections.

9. The apparatus according to claim 8 wherein stop means are provided for stopping the movement of the inner mold and said two mold sections, as the ram is moved a predetermined distance away from the plate, so that, in order, one of the two mold sections is moved to spaced relation below the top plate,
the inner mold member is moved to spaced relation below, and in open position relative to, said one of said two mold sections;
the other of said two mold sections is moved to spaced relation below, and in open relation to, the inner mold member; and
the ram is moved to spaced relation below said other of said two mold sections.

10. The apparatus according to claim 9 wherein said additional mold sections, when in closed position, have their ends juxtaposed against the head plate and ram, respectively, so that the closing pressure is applied by the ram and head plate directly to, and is maintained directly on, said additional mold sections concurrently with the application and maintenance of closing pressure on said two sections.

* * * * *

UNITED STATES PATENT OFFICE
CERTIFICATE OF CORRECTION

Patent No. 3,829,271　　　　　　Dated August 13, 1974

Inventor(s) DON A. TAYLOR

It is certified that error appears in the above-identified patent and that said Letters Patent are hereby corrected as shown below:

Page 1, for address of inventor read --Box 4, Wadsworth, Ohio 44281--.
　　　References, line 6, for "Donsfio" read --Donofrio--.
　　　Abstract, last line, for "threads" read --treads--.
Col. 2, line 52, for "shaped" read --shape--.
Col. 7, line 22, for "thats" read --that its--.
Col. 8, line 13, for "nib" read --rib--; line 19, for "a" read --an--; line 48, for numeral "7" read --9--; line 65, after "M₁," read --and then for--

Signed and sealed this 3rd day of December 1974.

(SEAL)
Attest:

McCOY M. GIBSON JR.　　　　　　C. MARSHALL DANN
Attesting Officer　　　　　　　Commissioner of Patents